United States Patent
Altintas et al.

(10) Patent No.: US 10,789,848 B2
(45) Date of Patent: Sep. 29, 2020

(54) MULTI-LEVEL HYBRID VEHICLE-TO-ANYTHING COMMUNICATIONS FOR COOPERATIVE PERCEPTION

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Mountain View, CA (US)

( * ) Notice: Subject to any disclaimer, the term of this patent is extended or adjusted under 35 U.S.C. 154(b) by 177 days.

(21) Appl. No.: 15/958,969

(22) Filed: Apr. 20, 2018

(65) Prior Publication Data

US 2019/0325751 A1    Oct. 24, 2019

(51) Int. Cl.
| | |
|---|---|
| *G08G 1/16* | (2006.01) |
| *G05D 1/00* | (2006.01) |
| *G05D 1/02* | (2020.01) |
| *H04W 4/44* | (2018.01) |

(52) U.S. Cl.
CPC .......... *G08G 1/162* (2013.01); *G05D 1/0077* (2013.01); *G05D 1/0221* (2013.01); *G08G 1/166* (2013.01); *H04W 4/44* (2018.02)

(58) Field of Classification Search
CPC ........ G08G 1/166; G08G 1/162; G08G 1/163; G05D 1/0221; G05D 1/0077; H04W 4/44; H04W 4/46; H04W 88/06; H04W 4/06
See application file for complete search history.

(56) References Cited

U.S. PATENT DOCUMENTS

| | | | |
|---|---|---|---|
| 10,068,336 B1 * | 9/2018 | Zhang | .................. G06T 7/13 |
| 2010/0214085 A1 | 8/2010 | Avery et al. | |
| 2017/0111122 A1 | 4/2017 | Shimizu et al. | |
| (Continued) | | | |

FOREIGN PATENT DOCUMENTS

| | | |
|---|---|---|
| CN | 101799992 | 8/2010 |
| CN | 103733084 | 4/2014 |
| (Continued) | | |

OTHER PUBLICATIONS

EPO, Extended European Search Report for European Patent Application No. 19169722.6, dated Sep. 17, 2019, 6 pages.

(Continued)

*Primary Examiner* — Mussa A Shaawat
(74) *Attorney, Agent, or Firm* — Burbage Law, P.C.; Jon-Michael Burbage; Elizabeth Ruzich

(57) ABSTRACT

The disclosure includes embodiments for providing cooperative perception among two or more connected vehicles. In some embodiments, a method includes receiving, by a vehicle-to-anything (V2X) radio of an ego vehicle, a basic cooperative perception message (CPM) broadcast by a remote vehicle. The basic CPM includes basic CPM data describing objects that a remote vehicle has perceived. The method includes determining that the remote vehicle has misperceived a select object and that the remote vehicle is on a collision course with the select object. The method includes unicasting to the remote vehicle, by the V2X radio of the ego vehicle using a different V2X protocol than was used for receiving the basic CPM, a supplemental CPM including supplemental CPM data describing the select object that the remote vehicle has misperceived so that the remote vehicle is alerted to a presence of the select object.

20 Claims, 8 Drawing Sheets

(56) References Cited

U.S. PATENT DOCUMENTS

| | | | |
|---|---|---|---|
| 2018/0005460 A1* | 1/2018 | Alieiev | G08G 1/096791 |
| 2018/0077518 A1 | 3/2018 | Nguyen et al. | |
| 2018/0149730 A1* | 5/2018 | Li | G01S 7/023 |
| 2018/0287763 A1* | 10/2018 | Baghel | H04W 28/04 |
| 2019/0031038 A1* | 1/2019 | Pursifull | B60L 53/31 |
| 2019/0036652 A1* | 1/2019 | Baghel | H04W 4/40 |
| 2019/0041867 A1* | 2/2019 | Graefe | G05D 1/0276 |
| 2019/0045244 A1* | 2/2019 | Balakrishnan | H04N 21/23605 |
| 2019/0056743 A1* | 2/2019 | Alesiani | G01C 21/005 |
| 2019/0098088 A1* | 3/2019 | Baltar | H04L 67/303 |
| 2019/0163189 A1* | 5/2019 | Jensen | G05D 1/0212 |
| 2019/0163201 A1* | 5/2019 | Jensen | G05D 1/0268 |
| 2019/0182700 A1* | 6/2019 | Kim | H04W 12/06 |
| 2019/0222652 A1* | 7/2019 | Graefe | H04W 84/18 |
| 2019/0238273 A1* | 8/2019 | Wu | H04W 76/28 |
| 2019/0250621 A1* | 8/2019 | Ghannam | G08B 21/10 |
| 2019/0283672 A1* | 9/2019 | Daman | B60K 37/00 |
| 2020/0077278 A1* | 3/2020 | Jornod | H04W 16/22 |

FOREIGN PATENT DOCUMENTS

| | | |
|---|---|---|
| CN | 106470383 | 3/2017 |
| EP | 3291201 | 3/2018 |
| JP | PO2017-187863 | 10/2017 |
| WO | WO2016-147622 | 9/2016 |

OTHER PUBLICATIONS

JPO, Office Action (with English translation) for Japanese Patent Application No. 2019-064156, 3 pages, Feb. 18, 2020.

JPO, Office Action (with English translation) for Japanese Patent Application No. 2019-064156, 3 pages, dated May 12, 2020.

CNIPA, Office Action (with English translation) for Chinese Patent Application No. 201910304160.8, dated Jul. 3, 2020, 10 pages.

* cited by examiner

| Message Name | Payload Type | Objects Identified | Directionality of Transmission | Transmission Recipients | Protocols Used | Transmission Range | Data Rate | Payload Size |
|---|---|---|---|---|---|---|---|---|
| Basic CPM | Coarse-grained information | All objects detected by a remote vehicle | Omni-directional | Broadcast for all endpoints within transmission range | IEEE 802.11p, DSRC, WiFi, TV white space, or LPWAN | ~ 300 meters | Lower (6 Mb/s) | Smaller |
| Supplemental CPM | Fine-grained information | Select objects detected by a ego vehicle and missed (or misperceived) by the remote vehicle | Directional | Unicast to remote vehicle | mmWave or visible light communicators | ~ 30 meters | Higher (100 Mb/s to 1 Gb/s) | Larger |

Figure 4B

MULTI-LEVEL HYBRID VEHICLE-TO-ANYTHING COMMUNICATIONS FOR COOPERATIVE PERCEPTION

BACKGROUND

The specification relates to multi-level hybrid vehicle-to-anything (V2X) communications for cooperative perception among two or more connected vehicles.

Automobile manufacturers are attempting to manufacture automated vehicles that drive themselves without human intervention. An obstacle to automated vehicle technology is the ability of the automated vehicle to precisely and accurately perceive its own driving state (e.g., position) and the surrounding environment. This obstacle has not yet been overcome by automobile manufacturers.

SUMMARY

Described herein are embodiments of a perception system. The perception system is installed in an onboard unit of a connected vehicle. The connected vehicle may or may not be an automated vehicle. The connected vehicle has various types of V2X radios and is operable to end and receive various types of V2X messages. For example, the connected vehicle includes one or more V2X radios having channels that are operable to send or receive one or more of the following types of V2X messages: Institute of Electrical and Electronics Engineers (IEEE) 802.11p (802.11p); Dedicated Short-Range Communication (DSRC); Long-Term Evolution (LTE); wireless fidelity (WiFi); and millimeter wave (mmWave); 3G; 4G; 5G; LTE-Vehicle-to-Anything (LTE-V2X); LTE-Vehicle-to-Vehicle (LTE-V2V); LTE-Device-to-Device (LTE-D2D); 5G-V2X; Intelligent Transportation System-G5 (ITS-G5); ITS-Connect; Voice over LTE (VoLTE); television (TV) white space and any derivative or fork of one or more of the V2X communication protocols listed here.

As used herein, "802.11p" refers to V2X messages that are compliant with the IEEE 802.11p amendment to the IEEE 802.11 standard for sending and receiving wireless messages by a connected vehicle or a connected roadway infrastructure device such as a roadside unit ("RSU" if singular, "RSUs" if plural).

In some embodiments, the perception system is operable to provide cooperative perception among two or more connected vehicles using multi-level hybrid V2V communications and thereby enable at least one of the connected vehicles to precisely and accurately perceive its own driving state (e.g., position) and the surrounding environment. In some, embodiments, the perception system uses a combination of both: (1) omni-directional V2V messages; and (2) directional V2V messages to enable connected vehicles to communicate with one another to exchange sensor information and more precisely perceive their own driving state and surrounding environment. As an example, the perception system uses 802.11p for the omni-directional V2V messages while using mmWave communication for the directional V2V messages. However, any other V2V communication technologies can be also used instead of 802.11p and mmWave. For example, the perception system may use DSRC, cellular V2X, WiFi and TV white space channels for the omni-directional communications instead of 802.11p. In another example, the perception system uses visible light communications for the directional communications instead of mmWave.

An example of the perception system is now described according to some embodiments. Assume a roadway environment includes an ego vehicle and a plurality of remote vehicles. The ego vehicle and the remote vehicles each include their own instance of an onboard unit including a perception system. The perception system of a remote vehicle monitors the sensor measurements recorded by the remote vehicle's onboard sensor system and constructs a Basic Cooperative Perception Message ("basic CPM" if singular, "basic CPMs" if plural) that is broadcast via 802.11p. The basic CPM includes basic CPM data. The basic CPM data is digital data that describes coarse-grained information about the roadway environment that is specifically configured to be less than the payload limit of 802.11p. The basic CPM data describes each of the objects identified by the remote vehicle that transmits the basic CPM. Each of the remote vehicles also construct and broadcast their own basic CPMs. The perception system of the ego vehicle receives the basic CPM data for each of these remote vehicles and forms a basic CPM data set. The basic CPM data set is a data structure that stores the basic CPM data received from each of the remote vehicles. The perception system of the ego vehicle analyzes the basic CPM data set and identifies, for each of the remote vehicles, objects which the remote vehicles have misperceived. A misperceived object is one which the remote vehicle has either: not detected; incorrectly classified; or otherwise poorly perceived. The perception system of the ego vehicle then builds a Supplemental Cooperative Perception Message ("supplemental CPM" if singular, "supplemental CPMs" is plural) for each remote vehicle that has misperceived at least one object. The supplemental CPM includes supplemental CPM data. The supplemental CPM data is digital data that described fine-grained information about the roadway environment that is custom built for a particular remote vehicle based on the objects it has misperceived. The supplemental CPM data far exceeds the payload limit of 802.11p messages or DSRC messages and cannot be sent via either 802.11p or DSRC. Instead, the supplemental CPM is unicast via mmWave to the particular remote vehicle that was considered when building the supplemental CPM data.

The term "cooperative perception" refers to two or more connected vehicles using V2V technology to exchange sensor information that describes their shared environment for the purpose of attempting to understand their environment and their position in the environment. Existing solutions for cooperative perception rely on a single level of V2V technology to exchange sensor information with one another, usually omni-directional V2V messages broadcast by a DSRC radio. By comparison, embodiments of the perception system described herein relies on two levels of V2V technology to exchange sensor information with one another: (1) omni-directional V2V messages; and (2) directional V2V messages. The existing solutions do not include this multi-level hybrid approach to sensor information exchange. As a result, the existing solutions are inadequate to help vehicles to understand their state and surrounding environment because the bandwidth for radio is quite limited and experience has shown that data included in the DSRC messages used by the existing solutions can only help a connected vehicle to identify about twenty objects in their environment.

Existing solutions for cooperative perception rely on V2V messaging (typically DSRC) that has a payload which limits them to identifying about twenty objects in their roadway environment. The roadway environment typically has more than twenty objects, meaning that existing solutions are inadequate. mmWave communication has a larger bandwidth but is not ideal for V2V broadcast because this form of wireless communication includes a strict line-of-sight requirement. The embodiments of the perception system described herein use a multi-level hybrid approach to cooperative perception that combines the ease of 802.11p communication with the large bandwidth of mmWave communication. As a result, the embodiments described herein have been shown to reliably and unexpectedly help connected vehicles (including automated vehicles) to correctly perceive their position in a roadway environment as well as the positions and classifications for each of the other objects that are located in that roadway environment. None of the existing solutions use a multi-level hybrid approach as is used by the embodiments of the perception system described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a V2X radio of an ego vehicle, a basic CPM transmitted by a remote vehicle, where the basic CPM includes basic CPM data describing objects that a remote onboard sensor set of the remote vehicle has perceived; determining, based on the basic CPM data and a set of objects that a local onboard sensor set of an ego vehicle has perceived, that the remote onboard sensor set of the remote vehicle has misperceived a select object and that the remote vehicle is on a collision course with the select object; and transmitting to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object. Other embodiments of this aspect include corresponding computer systems, apparatus, and computer programs recorded on one or more computer storage devices, each configured to perform the actions of the methods.

Implementations may include one or more of the following features. The method where the basic CPM is received via an 802.11p message which is broadcast. The method where the supplemental CPM is transmitted via a millimeter wave message which is unicast to the remote vehicle. The method where a transmission range of the basic CPM is substantially 300 meters. The method where a transmission range of the supplemental CPM is substantially 30 meters. The method where the method is executed by an onboard vehicle computer of the ego vehicle. The method may also include the method where the basic CPM data describes each object that the remote onboard sensor set of the remote vehicle has perceived. Implementations of the described techniques may include hardware, a method or process, or computer software on a computer-accessible medium.

One general aspect includes a system including: a processor communicatively coupled to a non-transitory memory that stores computer code that is operable, when executed by the processor, to cause the processor to: receive, by a V2X radio of an ego vehicle, a basic CPM transmitted by a remote vehicle, where the basic CPM includes basic CPM data describing objects that a remote onboard sensor set of the remote vehicle has perceived; determine, based on the basic CPM data and a set of objects that a local onboard sensor set of an ego vehicle has perceived, that the remote onboard sensor set of the remote vehicle has misperceived a select object and that the remote vehicle is on a collision course with the select object; and transmit to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object. Other embodiments of this aspect include corresponding computer systems, apparatus, and computer programs recorded on one or more computer storage devices, each configured to perform the actions of the methods.

Implementations may include one or more of the following features. The system where the basic CPM is received via an 802.11p message which is broadcast. The system where the supplemental CPM is transmitted via a millimeter wave message which is unicast to the remote vehicle. The system where a transmission range of the basic CPM is substantially 300 meters. The system where a transmission range of the supplemental CPM is substantially 30 meters. The system where the processor is an element of an onboard vehicle computer of the ego vehicle. The system may also include the system where the remote vehicle is a highly automated vehicle that operates itself without human intervention and the remote vehicle modifies its operation based on the supplemental CPM data so that a collision with the object does not occur. Implementations of the described techniques may include hardware, a method or process, or computer software on a computer-accessible medium.

One general aspect includes a computer program product including instructions that, when executed by one or more processors, cause the one or more processors to perform operations including: receiving, by a V2X radio of an ego vehicle, a basic CPM transmitted by a remote vehicle, where the basic CPM includes basic CPM data describing objects that a remote onboard sensor set of the remote vehicle has perceived; determining, based on the basic CPM data and a set of objects that a local onboard sensor set of an ego vehicle has perceived, that the remote onboard sensor set of the remote vehicle has misperceived a select object and that the remote vehicle is on a collision course with the select object; and transmitting to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object. Other embodiments of this aspect include corresponding computer systems, apparatus, and computer programs recorded on one or more computer storage devices, each configured to perform the actions of the methods.

Implementations may include one or more of the following features. The computer program product where the basic CPM is received via an 802.11p message which is broadcast. The computer program product where the supplemental CPM is transmitted via a millimeter wave message which is unicast to the remote vehicle. The computer program product where a transmission range of the basic CPM is substantially 300 meters. The computer program product where a transmission range of the supplemental CPM is substantially 30 meters. The computer program product where one or more of the ego vehicle and the remote vehicle is a highly automated vehicle that operates itself without human intervention. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4B depicts a table illustrating attributes of the basic CPM and the supplemental CPM according to some embodiments.

DETAILED DESCRIPTION

Figure 1A:
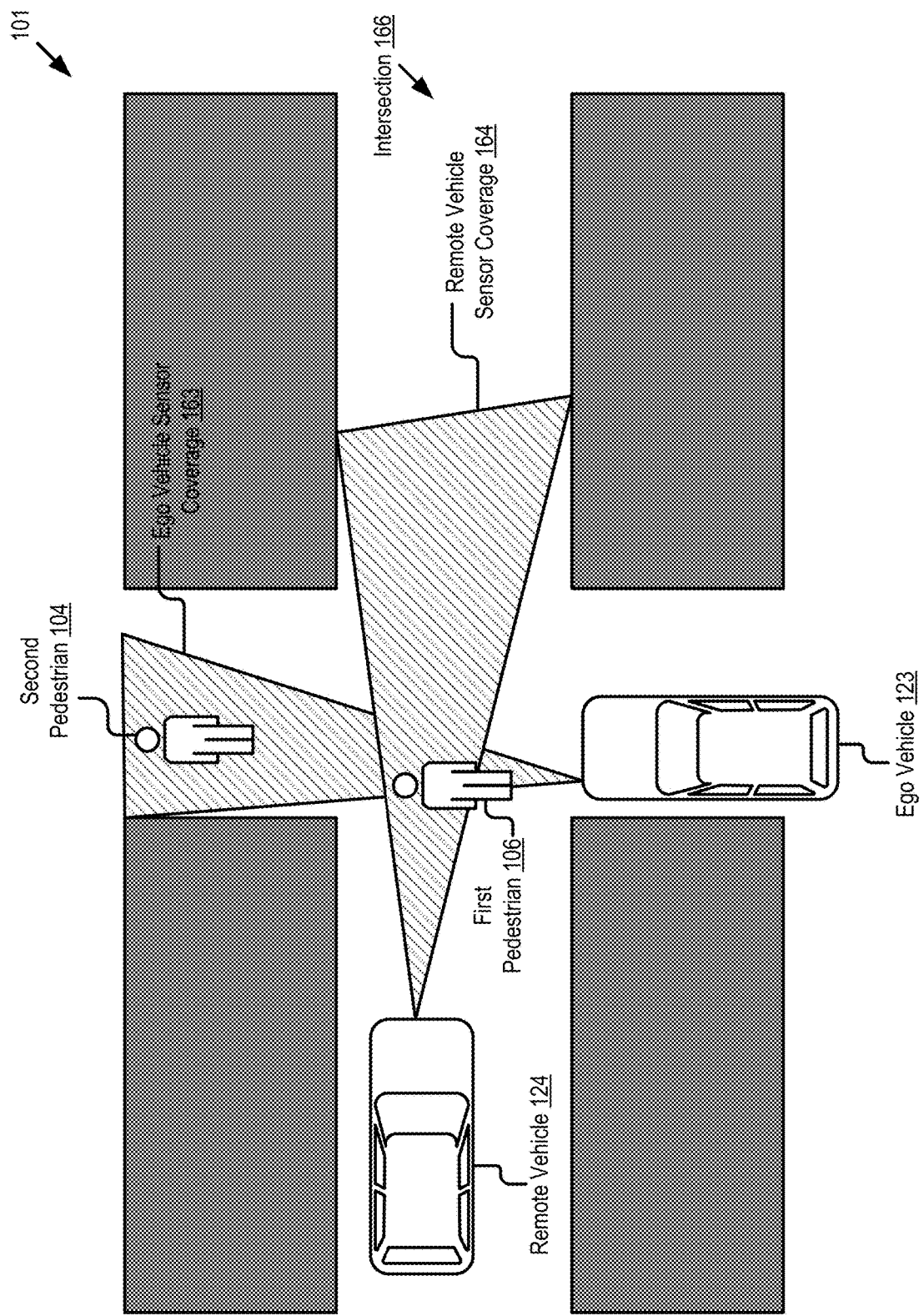
FIG. 1A is a block diagram illustrating an operating environment for a perception system according to some embodiments.

An obstacle in automated vehicle technology is the ability of the automated vehicle to precisely perceive its own driving state (e.g., position) and the surrounding environment. The embodiments of the perception system described herein use a combination of both (1) 802.11p messages and (2) mmWave messages to enable connected vehicles (including automated vehicles) to communicate with one another to exchange sensor information and more precisely perceive their own driving state and surrounding environment.

The term "cooperative perception" refers to two or more vehicles using V2V technology to exchange sensor information that describes their shared environment for the purpose of attempting to understand their environment and their position in the environment. The existing solutions for cooperative perception rely on a single level of V2V technology to exchange sensor information with one another, usually via DSRC messages. By comparison, our invention relies on two levels of V2V technology to exchange sensor information with one another: (1) 802.11p messages; and (2) mmWave messages. The existing solutions do not include this multi-level hybrid approach to sensor information exchange. As a result, the existing solutions are inadequate to help vehicles to understand their state and surrounding environment because of the limited bandwidth of DSRC radios and experience has shown that using DSRC message can only help a vehicle to identify about twenty objects in their environment.

By comparison, the embodiments of the perception system described herein rely on two levels of V2V technology to exchange sensor information with one another: (1) 802.11p messages; and (2) mmWave messages. The existing solutions do not include this multi-level hybrid approach to sensor information exchange. As a result, the existing solutions are inadequate to help connected vehicles to understand their state and surrounding environment because the bandwidth for DSRC radios (which is used by the existing solutions) is limited relative to mmWave radios and experience has shown that using digital data included in DSRC messages can only help a connected vehicle to identify coarse-grained information (e.g., types and positions) about twenty objects in their environment due to the payload limitations of DSRC. This is problematic because roadway environments frequently include far more than twenty objects and connected vehicles may require more detailed information about those objects (e.g., lidar point cloud data or occupancy grid map). As a result, the existing solutions are actually not very good at helping autonomous vehicles to accurately perceive their environment and their position in their environment. By comparison, the embodiments of the perception system described herein do not have this problem because mmWave technology has larger bandwidth (relative to DSRC) with a smaller risk of interference from neighboring vehicles (relative to DSRC) and is sufficient to enable an autonomous vehicle that includes the perception system to accurately perceive their entire environment, and not just twenty objects in that environment.

Embodiments of a perception system are described. A perception system includes code and routines that is installed in an onboard unit of a connected vehicle. The connected vehicle may or may not be an autonomous vehicle. Assume a roadway environment includes an ego vehicle and a plurality of remote vehicles, each of which includes a perception system. The perception system of an ego vehicle monitors the sensor measurements recorded by the ego vehicle's onboard sensor systems. Using this sensor information, the perception system of the ego vehicle constructs a basic CPM. The basic CPM includes basic CPM data. The basic CPM data is digital data that describes coarse-grained information about the roadway environment that includes the ego vehicle and the plurality of remote vehicles. In particular, the coarse-grained information described by the basic CPM data includes one or more of the following: a unique identifier for the objects identified by the perception system within the roadway environment; the positions of these objects; a classification for each object (e.g., is the object a pedestrian, car, truck, van, building, sign, pothole, etc.); and a confidence value that the classification is correct.

In some embodiments, the code and routines of the perception system includes an object identifier, a classifier and other software necessary to build the basic CPM.

In some embodiments, the ego vehicle and the remote vehicles include communication units that are operable to transmit and receive various types of V2X wireless messages, including 802.11p messages and mmWave messages, among others. The perception system of the ego vehicle controls the operation of the communication unit to cause the basic CPM to be broadcast to the plurality of remote vehicles using 802.11p. Optionally, the basic CPM may be unicast, but broadcasting is the preferred embodiment. The basic CPM is configured by the perception system of the ego vehicle to be 2304 bytes or less including headers and security overhead because this is the maximum packet length for a media access control (MAC) service data unit.

In some embodiments, the remote vehicles also broadcast their basic CPMs so that the perception system of the ego vehicle receives the basic CPM data for each of these remote vehicles. The perception system of the ego vehicle builds a basic CPM data set. The basic CPM data set is a data structure that stores the basic CPM data received from each of the remote vehicles as well as the basic CPM data recorded by the ego vehicle.

In some embodiments, the perception system of the ego vehicle analyses the basic CPM data set and identifies, for each of the remote vehicles, objects which they have: not detected; incorrectly classified; or otherwise poorly perceived. Based on this analysis, the perception system records perception data that describes: (1) which remote vehicles have poorly perceived at least one object; and (2) for each remote vehicle, the objects which they have poorly perceived.

The perception system of the ego vehicle then analyses the perception data and builds a Supplemental Cooperative Perception Message (supplemental CPM) for each remote vehicle that has poorly perceived at least one object. The supplemental CPM includes supplemental CPM data. The supplemental CPM data is digital data that describes fine-grained information about the roadway environment that is custom built for a particular remote vehicle based on the objects it has misperceived. For example, the supplemental CPM data includes a three-dimensional (3D) occupancy grid map for the objects which the particular remote vehicle has misperceived. The supplemental CPM data far exceeds the payload limit of 802.11p messages and DSRC messages and cannot be sent via 802.11p or DSRC. Instead, the supplemental CPM is unicast via mmWave (or some other radio having a similarly large bandwidth) to the particular remote vehicle that was considered by the perception system when building the supplemental CPM data.

In some embodiments, the ego vehicle and all the remote vehicles within the roadway environment complete the process of transmitting supplemental CPMs to neighboring vehicles so that each of the vehicles receives a set of supplemental CPM messages that their perception system can then consider. For example, these vehicles store LDM data that describes a Local Dynamic Map (LDM). The LDM describes one or more of the locations, headings, path history and classifications of both (1) the static objects and (2) the dynamic objects within the roadway environment. For example, the LDM described by the LDM data describes one or more of the following: the geographic positions of the static and the dynamic objects; the headings of the static and the dynamic objects; the path history of the static and the dynamic objects; and the classifications of the static and the dynamic objects. A classification includes, for example, digital data that describes a "type" or "class" for a particular object that is included in the LDM. For example, the object type or class is one or more of the following: a pedestrian; a vehicle; a bike; an animal; a pot hole; a light; a sign; a curb; a median; a rail; roadway debris; a drive through; an intersection; an on-ramp; an off-ramp; an exit; and some other type or class of roadway object. The perception system updates the locally stored LDM based on the set of supplemental CPM messages it receives, as well as the supplemental CPM data that these messages contain.

In some embodiments, the connected vehicles that includes the perception system are DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below.

A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a RSU, a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In the United States, Europe, and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: an 802.11p message; a WiFi message; a 3G message; a 4G message; an LTE message; a mmWave message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring now to FIG. 1A, depicted is an operating environment 101 for a perception system according to some embodiments.

The operating environment 101 depicts an example scenario that includes an ego vehicle 123 and a remote vehicle 124 located proximate to an intersection 166. The perception system is an element of both the ego vehicle and the remote vehicle. The ego vehicle 123 and the remote vehicle 124 are described in more detail below with reference to FIG. 1B. The operating environment 101 also includes a first pedestrian 106 and a second pedestrian 104. This is an example embodiment intended to introduce some of the functionality of the perception system, and not intended to be limiting in any way. As depicted, the ego vehicle 123 includes onboard sensors having an ego vehicle sensor coverage 163 that perceives the first pedestrian 106 and the second pedestrian 104. The remote vehicle 124 includes onboard sensors having an remote vehicle sensor coverage 164 that perceives the first pedestrian 106 but not the second pedestrian 104.

In the depicted embodiment, the first pedestrian 106 is detected by the onboard sensors of both the ego vehicle 123 and the remote vehicle 124, while the second pedestrian 104 is detected only by the ego vehicle 123. Both the ego vehicle 123 and the remote vehicle 124 periodically broadcast basic CPMs which include basic information (e.g., positions) of perceived objects such as the first pedestrian 106 and the second pedestrian 104.

Receiving a basic CPM from the remote vehicle 124, the perception system of the ego vehicle 123 determines that the second pedestrian 104 is not perceived by the remote vehicle 124 while it is very close to the second pedestrian 104, causing the risk of collision.

The perception system of the ego vehicle 123 transmits a supplemental CPM to the remote vehicle 124 that contains fine-grained information about the second pedestrian (e.g., 3D occupancy grid map describing the area around the second pedestrian 104).

In some embodiments, the perception system of the ego vehicle 123 suppresses transmission of the fine-grained information about the first pedestrian 106 since the basic CPM indicates that the remote vehicle 124 already clearly perceives the first pedestrian 106.

Figure 1B:
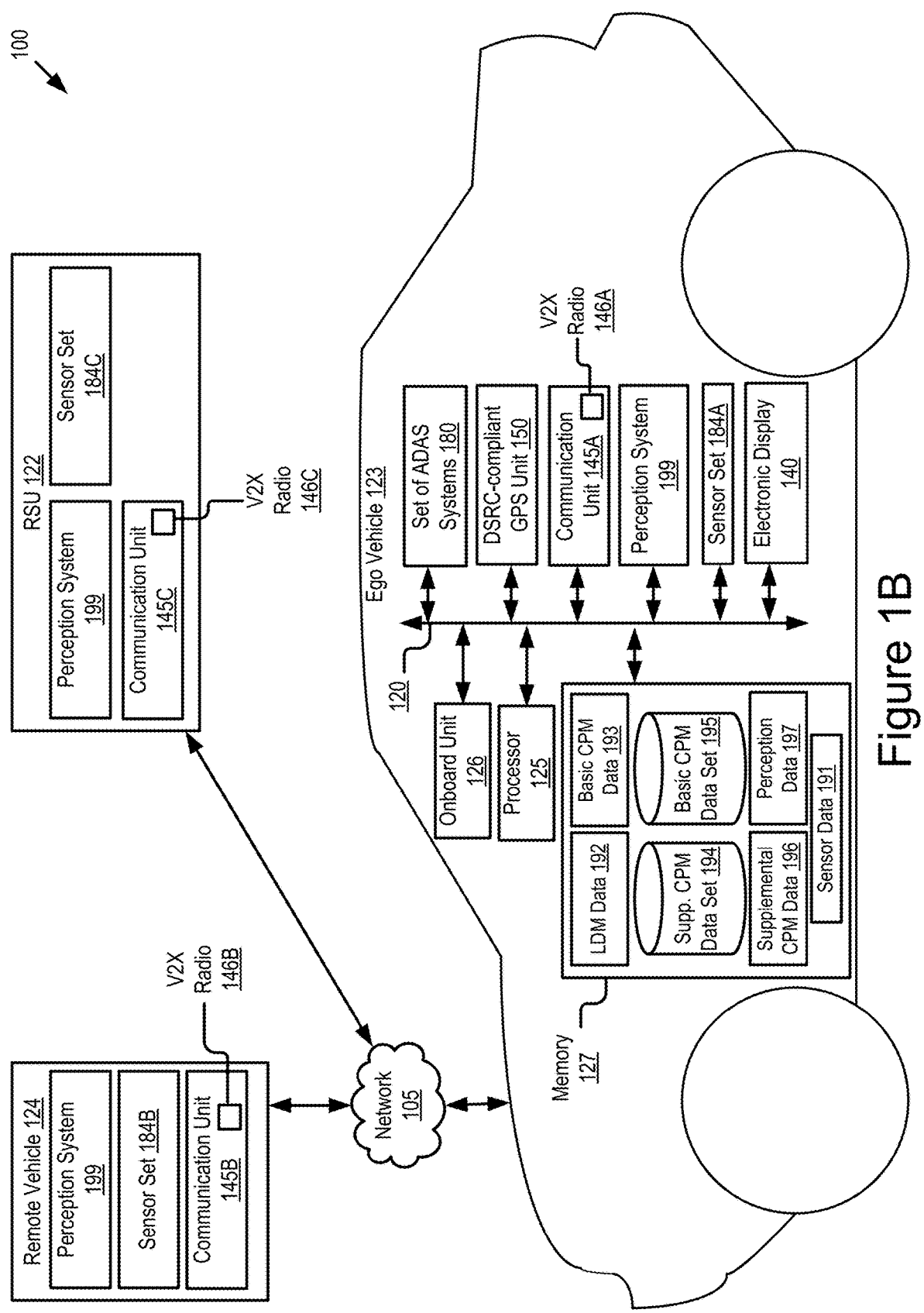
FIG. 1B is a block diagram illustrating an operating environment for a perception system according to some embodiments.

Referring to FIG. 1B, depicted is an operating environment 100 for a perception system 199 according to some embodiments. As depicted, the operating environment 100 includes the following elements: an ego vehicle 123; a remote vehicle 124; and an RSU 122. These elements are communicatively coupled to one another by a network 105.

Although one ego vehicle 123, one remote vehicle 124, one RSU 122, and one network 105 are depicted in FIG. 1A, in practice the operating environment 100 may include one or more ego vehicles 123, one or more remote vehicles 124, one or more RSUs 122, and one or more networks 105.

Both the ego vehicle 123 and the remote vehicle 124 are connected vehicles. For example, each of the ego vehicle 123 and the remote vehicle 124 include a communication unit 145A, 145B (referred to collectively or individually, along with the communication unit 145C of the RSU, as a "communication unit 145") and are therefore each are a connected vehicle that is operable to send and receive electronic messages (e.g., V2X messages) via the network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, 5G-V2X, ITS-G5, ITS-Connect, VoLTE, 802.11p, low-power wide-area network (LPWAN), visible light communication or any other mobile data network or combination of mobile data networks. Further, the network 105 may include one or more 802.11 wireless networks.

The following are endpoints of the network 105: the ego vehicle 123; the remote vehicle 124; and the RSU 122. In some embodiments, the ego vehicle 123 and one or more of the remote vehicle 124 include an instance of the perception system 199. The ego vehicle 123 and the remote vehicle 124 may be referred to collectively or individually as a "vehicular endpoint" or the "vehicular endpoints."

The ego vehicle 123 is any type of connected vehicle. For example, the ego vehicle 123 is one of the following types of vehicles that includes a communication unit 145A and a perception system 199: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of ADAS systems 180) which provide autonomous features to the ego vehicle 123 which are sufficient to render the ego vehicle 123 an autonomous vehicle. The set of ADAS systems 180 includes one or more ADAS systems.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, the ego vehicle 123 includes the following elements: the set of ADAS systems 180; an onboard unit 126; a processor 125; a memory 127; a communication unit 145; a DSRC-compliant GPS unit 150; a sensor set 184A; an electronic display 140; and a perception system 199. These elements of the ego vehicle 123 are communicatively coupled to one another via a bus 120.

The set of ADAS systems 180 was described above, and so, that description will not be repeated here.

Figure 2:
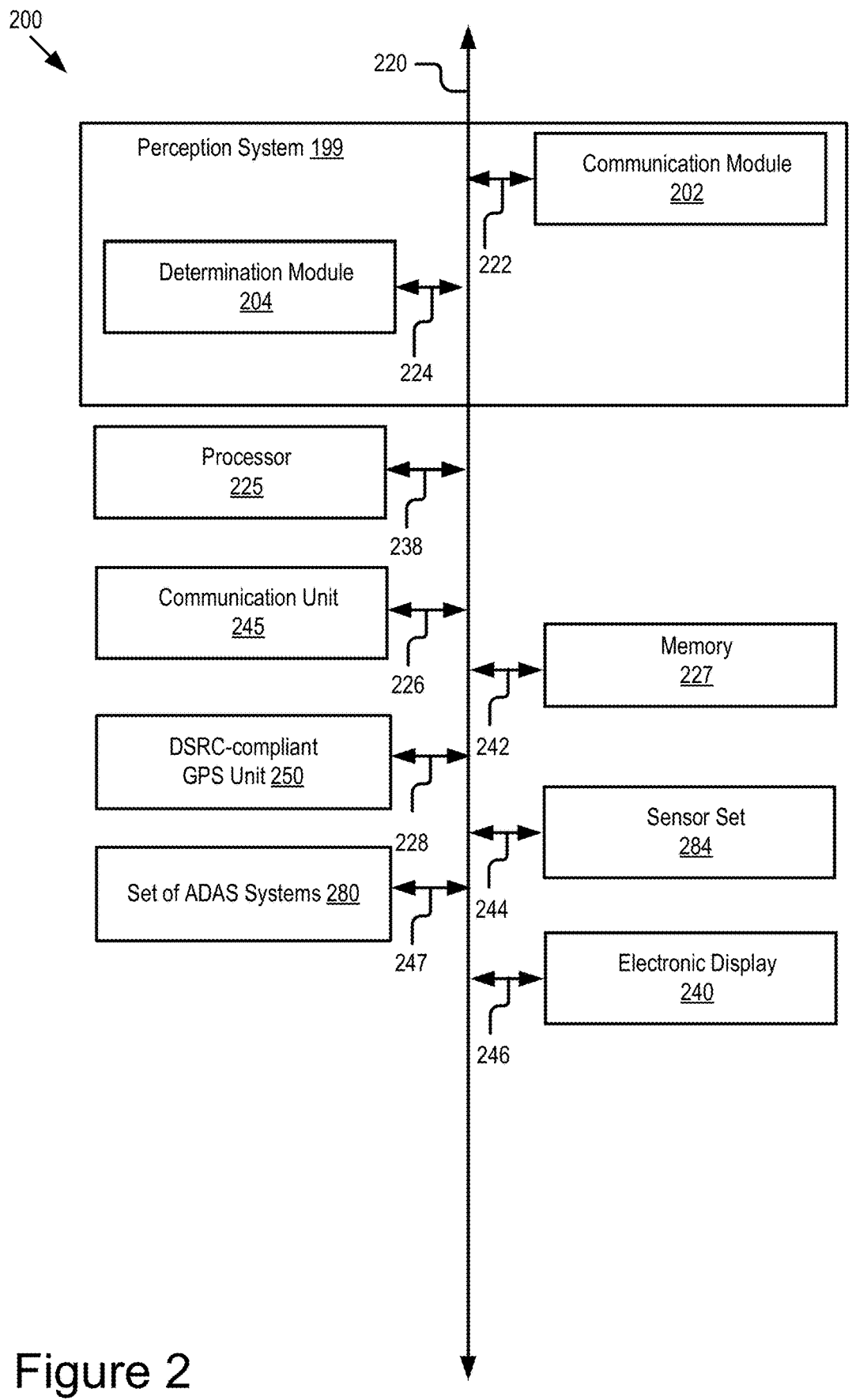
FIG. 2 is a block diagram illustrating an example computer system including the perception system according to some embodiments.

In some embodiments, the processor 125 and the memory 127 may be elements of an onboard vehicle computer system. The onboard vehicle computer system may be operable to cause or control the operation of the perception system 199 of the ego vehicle 123. The onboard vehicle computer system may be operable to access and execute the data stored on the memory 127 to provide the functionality described herein for the perception system 199 of the ego vehicle 123 or its elements. The onboard vehicle computer system may be operable to execute the perception system 199 which causes the onboard vehicle computer system to execute one or more steps of the method 300 described below with reference to FIG. 3 or one or more steps of the process flow 500 described below with reference to FIG. 5. The onboard vehicle computer system may be operable to execute the perception system 199 which causes the onboard vehicle computer system to execute the time to collision (TTC) analysis 699 described below with reference to FIG. 6. In some embodiments, the computer system 200 depicted in FIG. 2 is an example of the onboard vehicle computer system.

In some embodiments, the processor 125 and the memory 127 may be elements of the onboard unit 126. The onboard unit 126 includes an electronic control unit (herein "ECU") or an onboard vehicle computer system that may be operable to cause or control the operation of the perception system 199. In some embodiments, the onboard unit 126 is operable to access and execute the data stored on the memory 127 to provide the functionality described herein for the perception system 199 or its elements. The onboard unit 126 may be operable to execute the perception system 199 which causes the onboard unit 126 to execute one or more steps of the method 300 described below with reference to FIG. 3 or one or more steps of the process flow 500 described below with reference to FIG. 5. The onboard unit 126 may be operable to execute the perception system 199 which causes the onboard unit 126 to execute the TTC analysis 699 described below with reference to FIG. 6.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In some embodiments, the DSRC-compliant GPS unit 150 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the ego vehicle's 123 lane of travel within the roadway may be accurately determined based on the GPS data for this ego vehicle 123 as provided by the DSRC-compliant GPS unit 150. In some embodiments, the GPS data is an element of the basic CPM data 193 or the supplemental CPM data 196 that is transmitted by the communication unit 145A as an element of a basic CPM or a supplemental CPM, respectively.

In some embodiments, the DSRC-compliant GPS unit 150 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the perception system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 150, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the ego vehicle's 123 lane of travel. Identifying a lane of travel of a vehicle is beneficial, for example, because it leads to more accurate LDM data 192 and reduces collisions with objects such as pedestrians.

In some embodiments, the ego vehicle 123 may include a sensor set 184A. The sensor set 184A includes one or more sensors that are operable to measure the physical environment outside of the ego vehicle 123. For example, the sensor set 184A may include one or more sensors that record one or more physical characteristics of the physical environment that is proximate to the ego vehicle 123. The memory 127 may store sensor data 191 that describes the one or more physical characteristics recorded by the sensor set 184A. The sensor data 191 is stored in the memory 127. The sensor data 191 is depicted in FIG. 2 as being stored in a memory 227 of the computer system 200. In some embodiments, the DSRC-compliant GPS unit 150 is an element of the sensor set 184A.

In some embodiments, the sensor set 184A of the ego vehicle 123 may include one or more of the following vehicle sensors: a clock; a network traffic sniffer; a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 184A includes any sensors are necessary to build one or more of the basic CPM data 193, the supplemental CPM data 196, and the perception data 197.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 is a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.11p; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, SMTP, mmWave, DSRC, etc.

In some embodiments, the communication unit 145 includes a V2X radio 146A. The V2X radio 146A is a hardware unit that includes a transmitter and a receiver that is operable to send and receive wireless messages via any V2X protocol. For example, the V2X radio 146A includes any hardware and software that is necessary to send and receive one or more of the following types of V2X message: 802.11p; DSRC; LTE; mmWave communication; 3G; 4G; 5G LTE-V2X; LTE-V2V; LTE-D2D; 5G-V2X; ITS-G5; ITS-Connect; VoLTE; TV white space, LPWAN, visible light communication, and any derivative or fork of one or more of the V2X communication protocols listed here.

In some embodiments, the V2X radio 146A is a multi-channel V2X radio that includes a plurality of channels. In some embodiments, some of the channels are operable to send and receive V2X messages via a first V2X protocol whereas some of the channels are operable to send and receive V2X messages via an Nth V2X protocol (where "N" indicates any positive whole number greater than one).

In some embodiments, the V2X radio 146A is a DSRC radio. For example, the V2X radio 146A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184A) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 146A includes a non-transitory memory which stores digital data that controls the frequency for broadcasting BSM messages. In some embodiments, the non-transitory memory stores a buffered version of the GPS data for the ego vehicle 123 so that the GPS data for the ego vehicle 123 is broadcast as an element of the BSMs which are regularly broadcast by the V2X radio 146A. BSMs may be broadcast by the V2X radio 146A over various V2X protocols, and not just DSRC.

In some embodiments, the V2X radio 146A includes any hardware or software which is necessary to make the ego vehicle 123 compliant with the DSRC standard. In some embodiments, the DSRC-compliant GPS unit 150 is an element of the V2X radio 146A.

The electronic display 140 includes any type of electronic display device including, for example, one or more of the following: a dash meter display of the ego vehicle 123; a heads-up display unit (HUD) of the ego vehicle 123; an augmented reality (AR) display or viewing device of the ego vehicle 123; and a head unit of the ego vehicle 123. An example of a suitable HUD and AR viewing device is described in U.S. patent application Ser. No. 15/603,086 filed on May 23, 2017 and entitled "Providing Traffic Mirror Content to a Driver," the entirety of which is hereby incorporated by reference. Another example of a suitable HUD and AR viewing device is described in U.S. patent application Ser. No. 15/591,100 filed on May 9, 2017 and entitled "Augmented Reality for Vehicle Lane Guidance," the entirety of which is hereby incorporated by reference. In some embodiments, the electronic display 140 depicts graphical data describing an object which has been misperceived, and is described in a supplemental CPM, so that the driver can take remedial action to avoid a collision with the object.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

The memory 127 of the ego vehicle 123 stores one or more of the following types of digital data: the sensor data 191; the LDM data 192; the basic CPM data 193; a supplemental CPM data set 194; a basic CPM data set 195; supplemental CPM data 196; and perception data 197.

Although not depicted in FIG. 1B, in some embodiments the memory 127 stores one or more basic CPMs and one or more supplemental CPMs which are received from other vehicular endpoints via the network 105.

In some embodiments, the memory 127 stores, as digital data, any data described herein. In some embodiments, the memory 127 stores any data that is necessary for the perception system 199 to provide its functionality.

The sensor data 191 is digital data that describes the measurements and images captured by the sensor set 184A.

The basic CPM data 193 is the payload for a basic CPM. The basic CPM data 193 is digital data that describes coarse-grained information about the roadway environment that includes the ego vehicle 123 and the remote vehicle 124 (or a plurality of remote vehicles 124). In particular, the coarse-grained information described by the basic CPM data 193 includes one or more of the following: a unique identifier for the objects identified by the perception system within the roadway environment; the positions of these objects; a classification for each object (e.g., is the object a pedestrian, car, truck, van, building, sign, pothole, etc.); and a confidence value that the classification is correct.

In some embodiments, the code and routines of the perception system 199 includes an object identifier, a classifier, and other software necessary to generate the basic CPM data 193 and build the basic CPM.

In some embodiments, each of the remote vehicles 124, as well as the ego vehicle 123, build their own basic CPM data 193 based on their own sensor measurements (which are described by the sensor data 191) as recorded form their own position and sensor perspective. The perception system 199 of each of these vehicular endpoints receives the basic CPMs, which are broadcast via 802.11p or DSRC, and uses them to build the basic CPM data set 195. The basic CPM data set 195 is a data structure that stores the basic CPM data 193 received from each of the remote vehicles 124 as well as the basic CPM data 193 recorded by the perception system 199 of the ego vehicle 123.

The perception system 199 of the ego vehicle analyses (1) the basic CPM data set 195 and (2) the ego vehicle's own basic CPM data 193 that it generated based on its own sensor data 191. The ego vehicle's 123 own basic CPM data 193 describes the objects that have been perceived and identified by the sensor set 184A of the ego vehicle 123, and the digital data stored in the basic CPM data set 195 describes the objects that have been perceived and identified by the one or more remote vehicles 124. Based on this analysis, the perception system 199 identifies, for each of the remote vehicles 124 that transmitted a basic CPM received by the ego vehicle 123, objects which the remote vehicles 124 have misperceived. A misperceived object is one which a remote vehicle 124 has either: not detected; incorrectly classified; or otherwise poorly perceived. Based on this analysis, the perception system 199 of the ego vehicle 123 determines the perception data 197. The perception data 197 is digital data that describes: (1) which remote vehicles 124 have misperceived at least one object; and (2) for each remote vehicle 124 that has misperceived at least one object, the objects which they have misperceived.

In some embodiments, the perception system 199 of the ego vehicle then analyses the perception data 197 and builds a supplemental CPM for each remote vehicle that has misperceived at least one object. The supplemental CPM is an electronic message that includes supplemental CPM data 196. The supplemental CPM data 196 is digital data that described fine-grained information about the roadway environment that is custom built for a particular remote vehicle 124 based on the objects it has misperceived. For example, the supplemental CPM data 196 describes a 3D occupancy grid map for the objects which the particular remote vehicle 124 has misperceived. The supplemental CPM data 196 exceeds 1087 bytes and cannot be sent via DSRC or 802.11p (which is an example payload limitation of DSRC and 802.11p). Instead, the supplemental CPM is unicast via mmWave (or some other message format having a payload greater than 1087 bytes and sufficient to include the supplemental CPM data 196) to the particular remote vehicle 124 that was considered by the perception system 199 of the ego vehicle 123 when building the supplemental CPM data 196.

In some embodiments, the minimum payload needed to transmit a supplemental CPM including the supplemental CPM data 196 is greater than 1087 bytes and less than or equal to 2304 bytes including headers and security overhead for the supplemental CPM. In some embodiments, the minimum payload needed to transmit a basic CPM including the basic CPM data 193 is greater than 1087 bytes and less than or equal to 2304 bytes including headers and security overhead for the basic CPM. In some embodiments, a limitation to sending CPMs is the channel capacity of DSRC; accordingly, the basic CPMs and supplemental CPMs described here are configured to not meet or exceed the channel capacity of DSRC.

In some embodiments, all the remote vehicles 124 within the roadway environment complete the process of transmitting supplemental CPMs to neighboring vehicles (such as the ego vehicle 123 and other remote vehicles 124) so that each of these vehicles receive a set of supplemental CPM messages including supplemental CPM data 196 that their perception system can then consider. In some embodiments, the perception system 199 of the ego vehicle builds a supplemental CPM data set 194 based on the supplemental CPMs that it receives from the remote vehicles 124. The supplemental CPM data set 194 is a data structure that stores the supplemental CPM data 196 included in the supplemental CPMs that the ego vehicle 123 receives from the remote vehicles 124.

In some embodiments, the ego vehicle 123 and the remote vehicles 124 each store their own instance of LDM data 192. The LDM data 192 is digital data that describes an LDM. The LDM describes the locations, headings, path history and classifications of both (1) the static objects and (2) the dynamic objects within a roadway environment that includes the ego vehicle 123 and the remote vehicle 124. For example, the LDM described by the LDM data 192 describes one or more of the following: the geographic positions of the static and the dynamic objects; the headings of the static and the dynamic objects; the path history of the static and the dynamic objects; and the classifications of the static and the dynamic objects. A classification includes, for example, digital data that describes a "type" or "class" for a particular object that is included in the LDM. For example, the object type or class is one or more of the following: a pedestrian; a vehicle; a bike; an animal; a pot hole; a light; a sign; a curb; a median; a rail; roadway debris; a drive through; an intersection; an on-ramp; an off-ramp; an exit; and some other type or class of roadway object. The perception system 199 updates the locally stored LDM (i.e., updates the LDM data 192) based on the set of supplemental CPM messages it receives, as well as the supplemental CPM data 196 that these messages contain. In this way, the perception system 199 beneficially enables these vehicular endpoints to more accurately perceive their environment and their position in the environment.

The V2X radio 146A is a multi-channel V2X radio that includes various types of V2X radio channels, and as such, can transmit and receive various types of V2X communications.

In some embodiments, the perception system 199 includes software that is operable, when executed by the processor 125, to cause the processor 125 to execute one or more the steps of the method 300 depicted in FIG. 3 or one or more steps of the process flow 500 described below with reference to FIG. 5. The perception system 199 includes software that is operable, when executed by the processor 125, to cause the processor 125 to execute TTC analysis 699 described below with reference to FIG. 6.

In some embodiments, the perception system 199 is implemented using hardware including a field-programmable gate array ("FPGA") or an application-specific integrated circuit ("ASIC"). In some other embodiments, the perception system 199 is implemented using a combination of hardware and software.

The remote vehicle 124 includes elements similar to the ego vehicle 123, and so, those descriptions will not be repeated here. For example, the remote vehicle 124 includes one or more of the following elements: a perception system 199; a sensor set 184B and a communication unit 145B including a V2X radio 146B. The perception system 199 of the remote vehicle 124 provides the same functionality as the perception system 199 of the ego vehicle 123, and so that description will not be repeated here. The sensor set 184B of the remote vehicle 124 provides the same functionality as the sensor set 184A of the ego vehicle 123, and so that description will not be repeated here. The communication unit 145B and the V2X radio 146B of the remote vehicle 124 provide the same functionality as the communication unit 145A and the V2X radio 146A of the ego vehicle 123, and so, those descriptions will not be repeated here.

Although not depicted in FIG. 1B, in some embodiments the remote vehicle 124 includes one or more of the elements of the ego vehicle 123. For example, the remote vehicle 124 includes one or more of the following: an onboard unit 126; a processor 125; a memory 127; a set of ADAS systems 180; a DSRC-compliant GPS unit 150; and an electronic display 140.

The perception system 199 of the remote vehicle 124 provides the same functionality to the remote vehicle 124 as the perception system 199 of the ego vehicle 123 provides to the ego vehicle 123, and so, that description will not be repeated here.

The RSU 122 includes a smartphone, tablet computer, personal computer, roadside unit, or some other processor-based computing device that includes a communication unit such as the communication unit 145A. In some embodiments, the RSU 122 is a DSRC-equipped device. The RSU 122 is operable, for example, to receive V2X messages and relay these messages to other connected devices such as the ego vehicle 123 and the remote vehicle 124. In this way, the RSU 122 may relay a V2X message to an endpoint that would otherwise be outside of transmission range of an endpoint that transmitted the V2X message.

As depicted, the RSU 122 includes the following elements: a perception system 199; a sensor set 184C; a communication unit 145C including a V2X radio 146C.

The sensor set 184C of the RSU 122 provides the same functionality as the sensor set 184A of the ego vehicle 123, and so that description will not be repeated here. The communication unit 145C and the V2X radio 146C of the RSU 122 provide the same or similar functionality as the communication unit 145A and the V2X radio 146A of the ego vehicle 123, and so, those descriptions will not be repeated here. The perception system 199 of the RSU 122 provides the same functionality as the sensor set 184A of the ego vehicle 123, and so that description will not be repeated here.

Example Computer System

Referring now to FIG. 2, depicted is a block diagram illustrating an example computer system 200 including the perception system 199 according to some embodiments. In some embodiments, the computer system 200 may include a special-purpose computer system that is programmed to execute one or more steps of the method 300 described below with reference to FIG. 3 or one or more steps of the process flow 500 described below with reference to FIG. 5. In some embodiments, the computer system 200 is operable to execute the perception system 199 which causes the computer system 200 to execute the TTC analysis 699 described below with reference to FIG. 6.

In some embodiments, the computer system 200 is an onboard vehicle computer of a vehicle such as the ego vehicle 123 or the remote vehicle 124. In some embodiments, the computer system 200 is an onboard unit of the ego vehicle 123 or the remote vehicle 124. In some embodiments, the computer system 200 is an ECU, head unit or some other processor-based computing device of the ego vehicle 123 or the remote vehicle 124.

The computer system 200 includes one or more of the following elements according to some examples: the perception system 199; a processor 225; a communication unit 245; a memory 227; a DSRC-compliant GPS unit 250; an electronic display 240; and a set of ADAS systems 280. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 226. The memory 127 is communicatively coupled to the bus 220 via a signal line 242. The sensor set 284 is communicatively coupled to the bus 220 via a signal line 244. The DSRC-compliant GPS unit 150 is communicatively coupled to the bus 220 via a signal line 228. The electronic display 240 is communicatively coupled to the bus 220 via a signal line 246. The set of ADAS systems 280 is communicatively coupled to the bus 220 via a signal line 247.

The processor 225 provides similar functionality as the processor 125 described above with reference to FIG. 1B, and so, that description will not be repeated here. The communication unit 245 provides similar functionality as the communication unit 145 described above with reference to FIG. 1B, and so, that description will not be repeated here. The memory 227 provides similar functionality as the memory 127 described above with reference to FIG. 1B, and so, that description will not be repeated here. The sensor set 284 provides similar functionality as the sensor set 184 described above with reference to FIG. 1B, and so, that description will not be repeated here. The DSRC-compliant GPS unit 250 provides similar functionality as the DSRC-compliant GPS unit 150 described above with reference to FIG. 1B, and so, that description will not be repeated here. The electronic display 240 provides similar functionality as the electronic display 140 described above with reference to FIG. 1B, and so, that description will not be repeated here. The set of ADAS systems 280 provides similar functionality as the set of ADAS systems 180 described above with reference to FIG. 1B, and so, that description will not be repeated here.

The memory 227 may store any of the data described above with reference to FIGS. 1A and 1B or below with reference to FIGS. 2-6. The memory 227 may store any data needed for the computer system 200 to provide its functionality.

In the illustrated embodiment shown in FIG. 2, the perception system 199 includes: a communication module 202; and a determination module 204

The communication module 202 can be software including routines for handling communications between the perception system 199 and other components of the operating environment 100 of FIG. 1B.

In some embodiments, the communication module 202 can be a set of instructions executable by the processor 225 to provide the functionality described below for handling communications between the perception system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 227. The communication module 202 may send or receive any of the digital data or messages described above with reference to FIG. 1B, or below with reference to FIGS. 2-6, via the communication unit 245.

In some embodiments, the communication module 202 receives data from components of the perception system 199 and stores the data in the memory 227 (or a buffer or cache of the memory 227, or a standalone buffer or cache which is not depicted in FIG. 2). For example, the communication module 202 receives the basic CPM data 193 from the communication unit 245 and stores the basic CPM data 193 in the basic CPM data set 195 of the memory 227.

In some embodiments, the communication module 202 may handle communications between components of the perception system 199.

The determination module 204 can be software including routines for executing one or more steps of the method 300 described below with reference to FIG. 3. In some embodiments, the determination module 204 can be software including routines for executing the steps of the process flow 500 described below with reference to FIG. 5. In some embodiments, the determination module 204 can be software including routines for providing the analysis 699 described below with reference to FIG. 6.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

The determination module 204 is described in more detail below with reference to FIGS. 5 and 6.

Example Method

Figure 3:
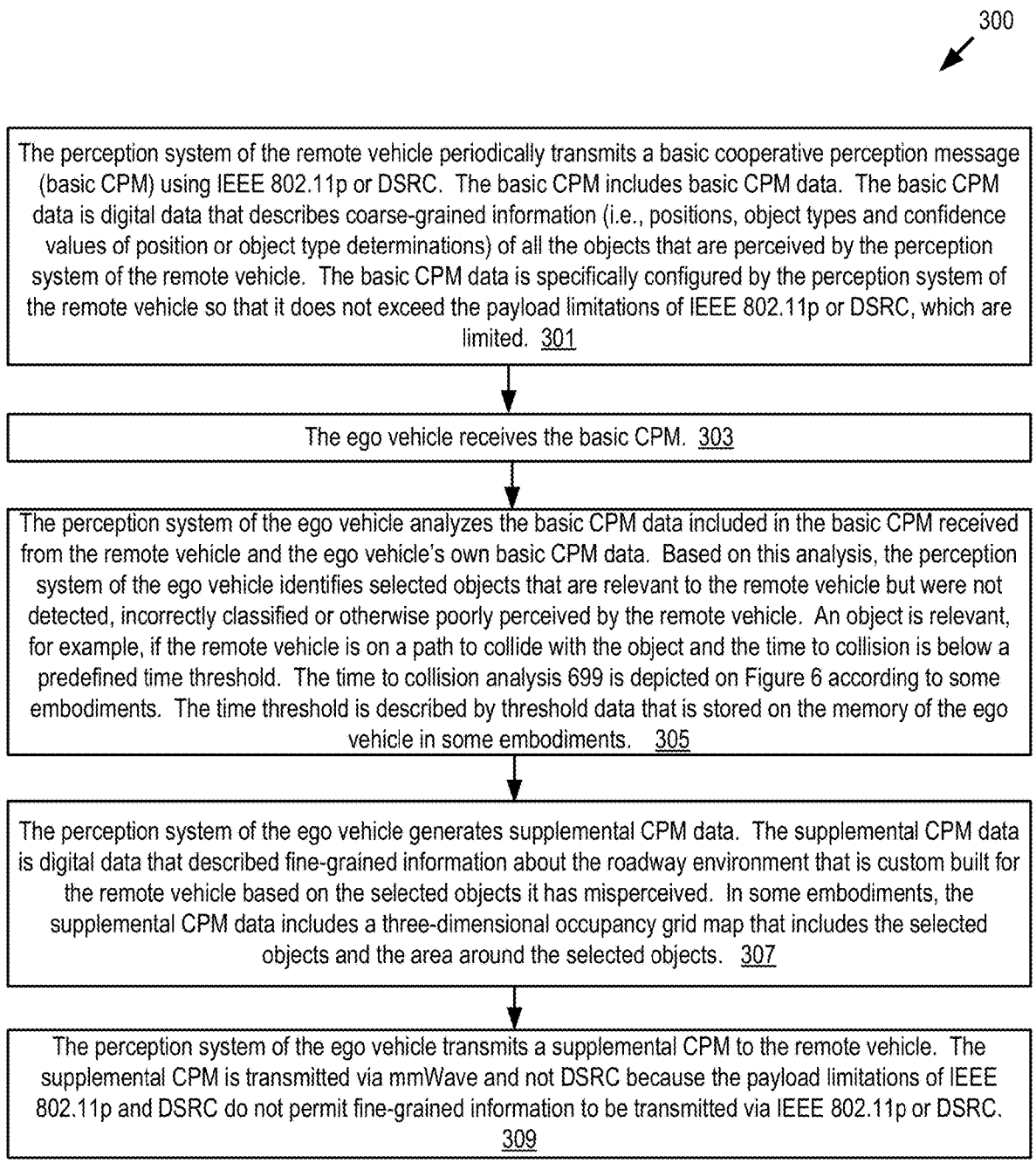
FIG. 3 depicts a method for the perception system to provide cooperative perception among two or more connected vehicles using multi-level hybrid V2V communications according to some embodiments.

Referring now to FIG. 3, depicted is a method 300 for the perception system 199 to provide cooperative perception among two or more connected vehicles using multi-level hybrid V2V communications according to some embodiments. The steps of the method 300 are executable in any order, and not necessarily the order depicted in FIG. 3.

At step 301, the perception system of the remote vehicle periodically transmits a basic CPM using 802.11p or DSRC. The basic CPM includes basic CPM data. The basic CPM data is digital data that describes coarse-grained information (i.e., positions, object types and confidence values of position or object type determinations) of all the objects that are perceived by the perception system of the remote vehicle. The basic CPM data is specifically configured by the perception system of the remote vehicle so that it does not exceed the payload limitations of 802.11p or DSRC, which are limited to 1087 bytes.

At step 303, the ego vehicle receives the basic CPM.

At step 305, the perception system of the ego vehicle analyzes the basic CPM data included in the basic CPM received from the remote vehicle at step 303 and the ego vehicle's own perception data. Based on this analysis, the perception system of the ego vehicle identifies selected objects that are relevant to the remote vehicle but were not detected, incorrectly classified or otherwise poorly perceived by the remote vehicle. An object is relevant, for example, if the remote vehicle is on a path to collide with the object and the time to collision is below a predefined time threshold. In some embodiments, step 305 includes the TTC analysis 699 depicted in FIG. 6. The time threshold is described by threshold data that is stored on the memory of the ego vehicle in some embodiments.

At step 307, the perception system of the ego vehicle generates supplemental CPM data. The supplemental CPM data is digital data that described fine-grained information about the roadway environment that is custom built for the remote vehicle based on the selected objects it has misperceived. In some embodiments, the supplemental CPM data includes a three-dimensional occupancy grid map that includes the selected objects and the area around the selected objects.

At step 309, the perception system of the ego vehicle transmits a supplemental CPM to the remote vehicle. The supplemental CPM is transmitted via mmWave and not DSRC because the payload limitations of 802.11p and DSRC do not permit fine-grained information to be transmitted via 802.11p or DSRC.

Figure 4A:
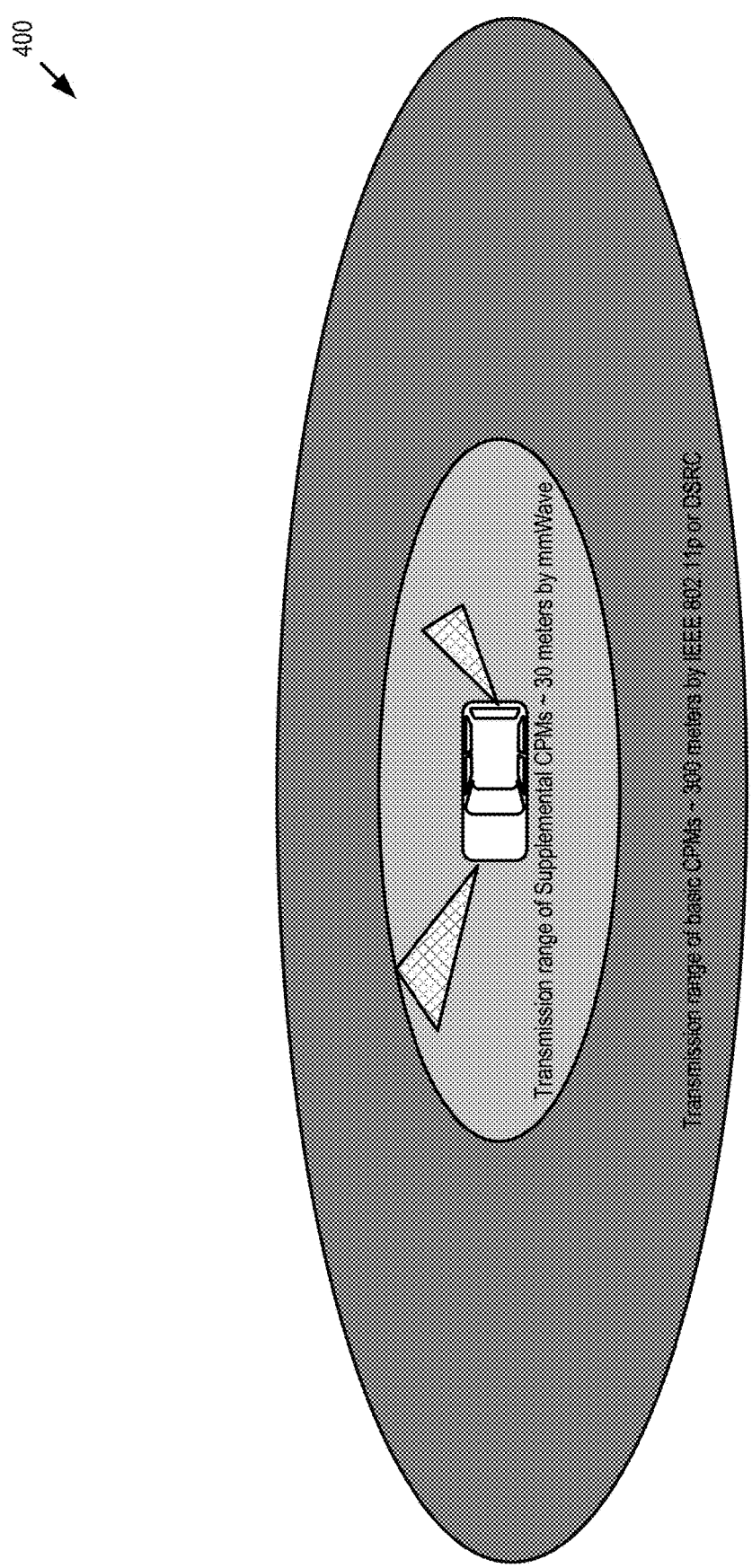
FIG. 4A depicts a block diagram illustrating a transmission range of a basic CPM and a transmission range of a supplemental CPM according to some embodiments.

Referring to FIG. 4A, depicted a block diagram illustrating a transmission range of a basic CPM and a transmission range of a supplemental CPM according to some embodiments. As depicted, the transmission range of a basic CPM transmitted via 802.11p or DSRC is approximately 300 meters to 1000 meters depending on variables such as the presence of obstructions and whether the terrain is urban or rural (increased obstructions decreases the transmission range). The transmission range of a supplemental CPM transmitted via mmWave is approximately 30 meters to 100 meters depending on variables such as the presence of obstructions and whether the terrain is urban or rural (increased obstructions decreases the transmission range).

Referring to FIG. 4B, depicted is a table 401 illustrating attributes of the basic CPM and the supplemental CPM according to some embodiments. The abbreviation "Mb/s" refers to megabytes per seconds. The abbreviation "Gb/s" refers to gigabytes per second.

Figure 5:
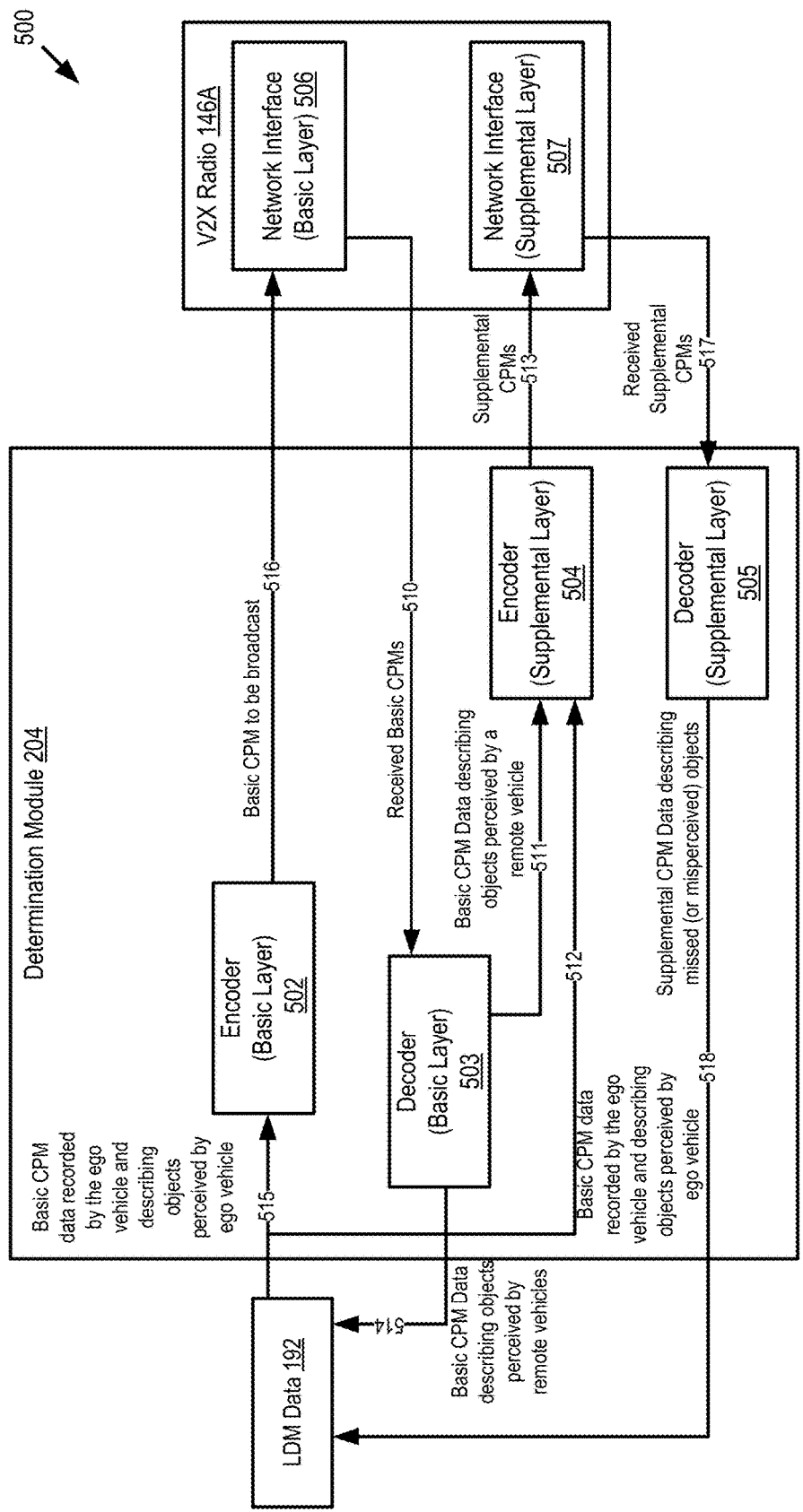
FIG. 5 depicts a process flow implemented by a determination module of the perception system according to some embodiments.

Referring now to FIG. 5, depicted a process flow 500 implemented by a determination module 204 of the perception system 199 according to some embodiments. The process flow 500 includes the determination module 204 and the V2X radio 146A. The depicted embodiment assumes that the process flow 500 is executed by a perception system 199 of the ego vehicle, but this is not intended to be limiting.

In some embodiments the process flow is executed by the perception system of the remote vehicle.

As depicted, the determination module 204 includes an encoder (basic layer) 502, a decoder (basic layer) 503, an encoder (supplemental layer) 504, and a decoder (supplemental layer) 505. The V2X radio 146A includes a network interface (basic layer) 506 and a network interface (supplemental layer) 507.

In some embodiments, the encoder (basic layer) 502 includes code and routines that are operable, when executed by a processor, to receive 515 the ego vehicle's locally generated basic CPM data and encode, from this basic CPM data, the basic CPM then cause 516 the network interface (basic layer) 506 to broadcast the basic CPM. The network interface (basic layer) 506 is an interface of the V2X radio 146A that is responsible for sending and receiving basic CPMs.

In some embodiments, the decoder (basic layer) 503 includes code and routines that are operable, when executed by a processor, to receive 510 a basic CPM transmitted by a remote vehicle and decode, from this basic CPM, the basic CPM data included in the basic CPM and then store 514 the basic CPM data from this basic CPM in the LDM data 192. In this way, the LDM described by the LDM data 192 is updated by the determination module 204 according to some embodiments.

In some embodiments, the encoder (supplemental layer) 504 includes code and routines that are operable, when executed by a processor, to: (1) receive 511 basic CPM data describing objects perceived by a remote vehicle; (2) receive 512 the ego vehicle's locally generated basic CPM data, which describes objects perceived by the ego vehicle; (3) determine, based on these inputs, objects which are relevant to the remote vehicle which provided by basic CPM data (i.e., the basic CPM data received 511) and misperceived by this remote vehicle; (4) generate supplemental CPM data based on these misperceived objects; (5) generate a supplemental CPM including the supplemental CPM data; and (6) cause 513 the network interface (supplemental layer) to unicast the supplemental CPM to the remote vehicle which provided by basic CPM data (i.e., the basic CPM data received 511). The network interface (supplemental layer) 507 is an interface of the V2X radio 146A that is responsible for sending and receiving supplemental CPMs.

In some embodiments, the decoder (supplemental layer) 505 includes code and routines that are operable, when executed by a processor, to receive 517 one or more supplemental CPMs transmitted by one or more remote vehicles and decode, from these basic CPMs, the basic CPM data included in these basic CPMs and then store 518 the basic CPM data from these basic CPMs in the LDM data 192. In this way, the LDM described by the LDM data 192 is updated by the determination module 204 according to some embodiments.

Figure 6:
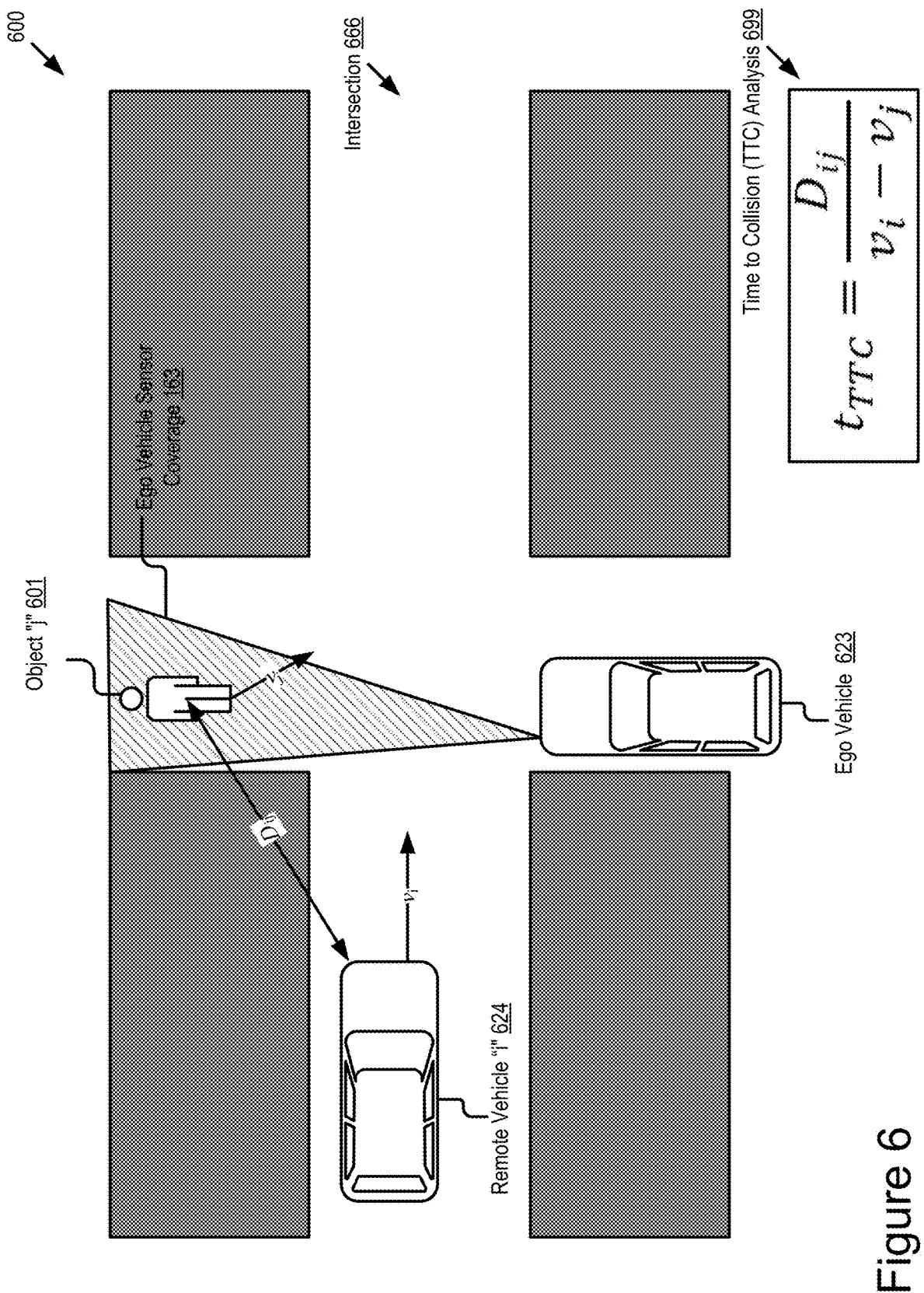
FIG. 6 depicts a block diagram illustrating an example time to collision (TTC) analysis provided by the perception system according to some embodiments.

Referring now to FIG. 6, depicted is a block diagram illustrating an example TTC analysis 699 provided by the perception system according to some embodiments.

FIG. 6 depicts an intersection 666 including an object "j" 699, a remote vehicle "i" 624 and an ego vehicle 623. The object "j" 699 depicted in FIG. 6 is a pedestrian, but in practice the object is any tangible object present in a roadway environment.

The remote vehicle "i" 624 provides similar functionality as the remote vehicle 124 described above for FIG. 1B, and so, that description will not be repeated here. The ego vehicle 623 provides similar functionality as the ego vehicle 123 described above for FIG. 1B, and so, that description will not be repeated here.

The ego vehicle 623 includes onboard sensors having an ego vehicle sensor coverage 163 that perceives the object "j" 601. The remote vehicle "i" 624 does not perceive the object "j" 601. The remote vehicle "i" 624 is separated a distance "$D_{ij}$" from the object "j" 601. The remote vehicle "i" 624 is traveling at a velocity $v_i$. The object "j" 601 is traveling at a velocity $v_j$. The analysis 699 determines a time to collision when the remote vehicle "i" 624 will collide with the object "j" 601. If this time is below the time threshold, then the perception system of the ego vehicle 623 determines that the object "j" 601 is relevant to the remote vehicle "i" 624. See, e.g., step 305 of the method 300 depicted on FIG. 3.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein.

This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by a vehicle-to-anything (V2X) radio of an ego vehicle, a basic cooperative perception message (CPM) transmitted by a remote vehicle, wherein the basic CPM includes basic CPM data describing objects that a remote onboard sensor set of the remote vehicle has perceived;
   determining, based on the basic CPM data and a set of objects that a local onboard sensor set of an ego vehicle has perceived, that the remote onboard sensor set of the remote vehicle has misperceived a select object and that the remote vehicle is on a collision course with the select object; and
   transmitting to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object.

2. The method of claim 1, wherein determining that the remote vehicle has misperceived the select object includes identifying that the select object was not detected, incorrectly classified, or poorly perceived.

3. The method of claim 2, wherein determining that the remote vehicle has misperceived the select object is further based on determining that the remote vehicle is on the collision course with the select object within a predefined time threshold.

4. The method of claim 1, wherein the supplemental CPM data includes a three-dimensional occupancy grid map for the select object that the remote vehicle has misperceived.

5. The method of claim 1, wherein a transmission range of the supplemental CPM is substantially 30 meters.

6. The method of claim 1, wherein the method is executed by an onboard vehicle computer of the ego vehicle.

7. The method of claim 1, wherein the basic CPM data describes each object that the remote onboard sensor set of the remote vehicle has perceived.

8. A system comprising:
a processor communicatively coupled to a non-transitory memory that stores computer code that is operable, when executed by the processor, to cause the processor to:
receive, by a vehicle-to-anything (V2X) radio of an ego vehicle, a basic cooperative perception message (CPM) transmitted by a remote vehicle, wherein the basic CPM includes basic CPM data describing objects that a remote onboard sensor set of the remote vehicle has perceived;
determine, based on the basic CPM data and a set of objects that a local onboard sensor set of an ego vehicle has perceived, that the remote onboard sensor set of the remote vehicle has misperceived a select object and that the remote vehicle is on a collision course with the select object; and
transmit to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object.

9. The system of claim 8, wherein determining that the remote vehicle has misperceived the select object includes identifying that the select object was not detected, incorrectly classified, or poorly perceived.

10. The system of claim 9, wherein determining that the remote vehicle has misperceived the select object is further based on determining that the remote vehicle is on the collision course with the select object within a predefined time threshold.

11. The system of claim 8, wherein the supplemental CPM data includes a three-dimensional occupancy grid map for the select object that the remote vehicle has misperceived.

12. The system of claim 8, wherein a transmission range of the supplemental CPM is substantially 30 meters.

13. The system of claim 8, wherein the processor is an element of an onboard vehicle computer of the ego vehicle.

14. The system of claim 8, wherein the remote vehicle is a highly automated vehicle that operates itself without human intervention and the remote vehicle modifies its operation based on the supplemental CPM data so that a collision with the select object does not occur.

15. A computer program product comprising instructions that, when executed by one or more processors, cause the one or more processors to perform operations comprising:
receiving, by a vehicle-to-anything (V2X) radio of an ego vehicle, a basic cooperative perception message (CPM) transmitted by a remote vehicle, wherein the basic CPM includes basic CPM data describing objects that a remote onboard sensor set of the remote vehicle has perceived;
determining, based on the basic CPM data and a set of objects that a local onboard sensor set of an ego vehicle has perceived, that the remote onboard sensor set of the remote vehicle has misperceived a select object and that the remote vehicle is on a collision course with the select object; and
transmitting to the remote vehicle, by the V2X radio of the ego vehicle using a different V2X protocol than was used for receiving the basic CPM, a supplemental CPM including supplemental CPM data describing the select object that the remote onboard sensor set of the remote vehicle has misperceived so that the remote vehicle is alerted to a presence of the select object.

16. The computer program product of claim 15, wherein determining that the remote vehicle has misperceived the select object includes identifying that the select object was not detected, incorrectly classified, or poorly perceived.

17. The computer program product of claim 16, wherein determining that the remote vehicle has misperceived the select object is further based on determining that the remote vehicle is on the collision course with the select object within a predefined time threshold.

18. The computer program product of claim 15, wherein the supplemental CPM data includes a three-dimensional occupancy grid map for the select object that the remote vehicle has misperceived.

19. The computer program product of claim 15, wherein a transmission range of the supplemental CPM is substantially 30 meters.

20. The computer program product of claim 15, wherein one or more of the ego vehicle and the remote vehicle is a highly automated vehicle that operates itself without human intervention.

* * * * *